(12) United States Patent
Ito et al.

(10) Patent No.: US 10,807,879 B2
(45) Date of Patent: *Oct. 20, 2020

(54) PROCESSING METHOD FOR LITHIUM ION BATTERY SCRAP

(71) Applicant: JX NIPPON MINING & METALS CORPORATION, Tokyo (JP)

(72) Inventors: Junichi Ito, Tsuruga (JP); Junichi Arakawa, Tsuruga (JP); Takuya Yokota, Hitachi (JP); Naoki Higuchi, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 16/085,337

(22) PCT Filed: Mar. 15, 2017

(86) PCT No.: PCT/JP2017/010480
§ 371 (c)(1),
(2) Date: Sep. 14, 2018

(87) PCT Pub. No.: WO2017/159743
PCT Pub. Date: Sep. 21, 2017

(65) Prior Publication Data
US 2019/0084839 A1 Mar. 21, 2019

(30) Foreign Application Priority Data

Mar. 16, 2016 (JP) ................. 2016-052803

(51) Int. Cl.
| | | |
|---|---|---|
| C01G 45/00 | (2006.01) | |
| C22B 3/00 | (2006.01) | |
| C22B 3/26 | (2006.01) | |
| C22B 3/44 | (2006.01) | |
| C22B 3/30 | (2006.01) | |
| C22B 3/38 | (2006.01) | |
| B09B 3/00 | (2006.01) | |
| C21B 15/00 | (2006.01) | |
| C22B 26/12 | (2006.01) | |
| C22B 7/00 | (2006.01) | |
| H01M 10/54 | (2006.01) | |
| C01G 51/00 | (2006.01) | |
| C01G 51/04 | (2006.01) | |
| C01G 53/00 | (2006.01) | |
| C01G 53/04 | (2006.01) | |

(52) U.S. Cl.
CPC .......... *C01G 45/003* (2013.01); *B09B 3/0016* (2013.01); *C01G 51/003* (2013.01); *C01G 51/04* (2013.01); *C01G 53/003* (2013.01); *C01G 53/04* (2013.01); *C21B 15/00* (2013.01); *C22B 3/0005* (2013.01); *C22B 3/0017* (2013.01); *C22B 3/0043* (2013.01); *C22B 3/44* (2013.01); *C22B 7/007* (2013.01); *C22B 23/043* (2013.01); *C22B 23/0407* (2013.01); *C22B 23/0461* (2013.01); *C22B 26/12* (2013.01); *H01M 10/54* (2013.01); *Y02P 10/234* (2015.11); *Y02P 10/236* (2015.11); *Y02W 30/84* (2015.05)

(58) Field of Classification Search
CPC .... C01G 45/003; C01G 51/003; C01G 51/04; C01G 53/003; C01G 53/04; C21B 15/00; C22B 3/0005; C22B 3/0017; C22B 3/0043; C22B 3/44; C22B 7/007; C22B 23/0407; C22B 23/043; C22B 23/0461; C22B 26/12; H01M 10/54; B09B 3/0016
USPC ..... 423/139, 24, 49, 150.3, 131, 132, 179.5, 423/27, 41, 112; 429/49
See application file for complete search history.

(56) References Cited

U.S. PATENT DOCUMENTS

| | | | | |
|---|---|---|---|---|
| 6,261,712 B1 * | 7/2001 | Hayashi | ............... | H01M 10/54 423/179.5 |
| 6,835,228 B1 * | 12/2004 | Lin | ....................... | C22B 3/0005 205/583 |
| 2011/0059339 A1 * | 3/2011 | Yamasaki | ............... | C22B 3/165 429/49 |
| 2011/0135547 A1 | 6/2011 | Kobayashi et al. | | |

(Continued)

FOREIGN PATENT DOCUMENTS

| | | |
|---|---|---|
| CN | 1601805 A | 3/2005 |
| CN | 102534223 A | 7/2012 |

(Continued)

OTHER PUBLICATIONS

International Search Report, issued in PCT/JP2017/010480, dated Apr. 18, 2017.

(Continued)

*Primary Examiner* — Steven J Bos
(74) *Attorney, Agent, or Firm* — Birch, Stewart, Kolasch & Birch, LLP

(57) ABSTRACT

A method for processing lithium ion battery scrap according to this invention includes a leaching step of leaching lithium ion battery scrap to obtain a leached solution; an aluminum removal step of neutralizing the leached solution to a pH range of from 4.0 to 6.0, then performing solid-liquid separation and removing aluminum in the leached solution to obtain a first separated solution; and an iron removal step of adding an oxidizing agent to the first separated solution and adjusting the pH in a range of from 3.0 to 5.0, then performing solid-liquid separation and removing iron in the first separated solution to obtain a second separated solution.

7 Claims, 3 Drawing Sheets

(56) References Cited

U.S. PATENT DOCUMENTS

| | | | | |
|---|---|---|---|---|
| 2013/0192425 | A1* | 8/2013 | Sonu | C22B 3/0068 |
| | | | | 75/743 |
| 2013/0269484 | A1* | 10/2013 | Ishida | C22B 7/007 |
| | | | | 75/743 |
| 2014/0227153 | A1* | 8/2014 | Laucournet | C22B 7/006 |
| | | | | 423/141 |

FOREIGN PATENT DOCUMENTS

| | | |
|---|---|---|
| EP | 2450991 A1 | 5/2012 |
| JP | 2010-180439 A | 8/2010 |
| JP | 2012-1750 A | 1/2012 |
| JP | 2013-181247 A | 9/2013 |
| JP | 2014-162982 A | 9/2014 |
| JP | 5706457 B2 | 4/2015 |
| WO | WO 2011/065682 A2 | 6/2011 |

OTHER PUBLICATIONS

Notification of Transmittal of Translation of the International Preliminary Report on Patentability; International Preliminary Report on Patentability and English Translation of Written Opinion of the International Searching Authority, dated Sep. 27, 2018, issued in PCT/JP2017/010480 (Forms PCT/IB/338; PCT/IB/373 and PCT/ISA/237).

Extended European Search Report for corresponding European Application No. 17766739.1, dated Oct. 23, 2019.

Extended European Search Report for European Application No. 17766741.7, dated Oct. 22, 2019.

International Search Report (PCT/ISA/210) issued in PCT/JP2017/010482, dated Apr. 18, 2017.

Non-Final Office Action dated Mar. 6, 2020 in copending U.S. Appl. No. 16/085,242.

Notification of Transmittal of Translation of the IPRP; International Preliminary Report on Patentability and English translation of Written Opinion of the International Search Authority, dated Sep. 27, 2018 for PCT/JP2017/010482 (Forms PCT/IB/338, PCT/IB/373 and PCT/ISA/237).

Chinese Office Action, dated Apr. 1, 2020, for corresponding Chinese Application No. 201780017652.8, along with an English translation.

Jiejiang, "Nickel Electrolytic Smelting Mahcine," Chinese: Karyo Electrolysis Smelting Machine, Metallurgical Industry Publishing Co., Jan. 2016, pp. 152-156 (Total pages 6).

* cited by examiner

[FIG. 1]
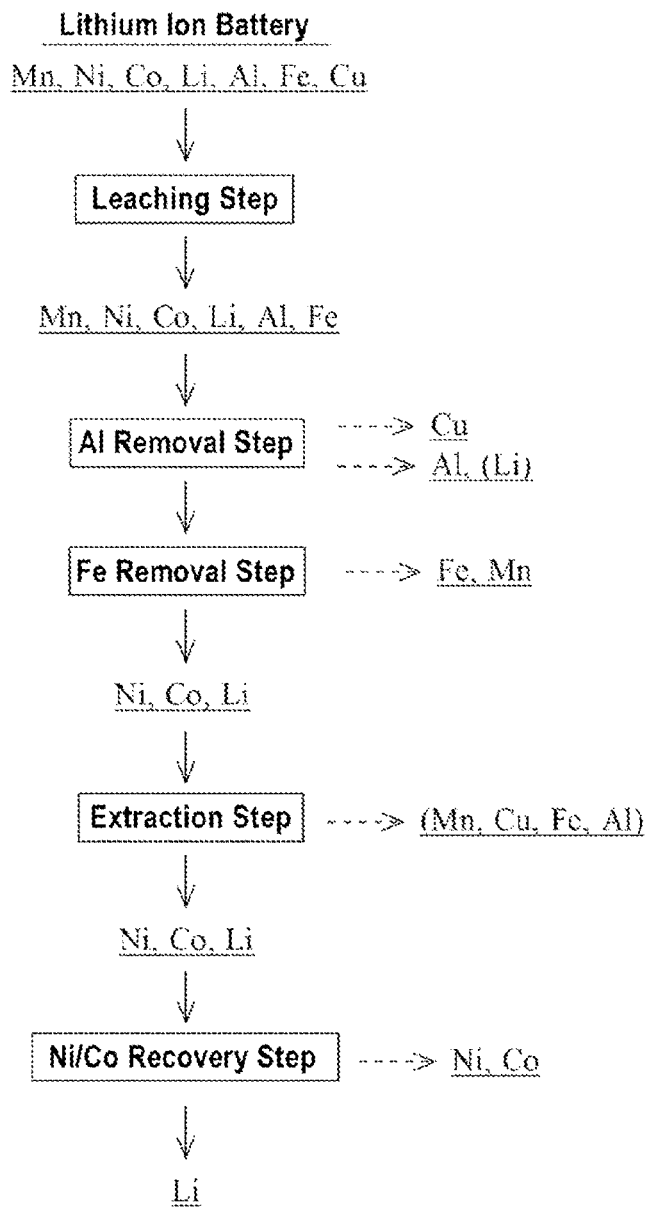

[FIG. 2]
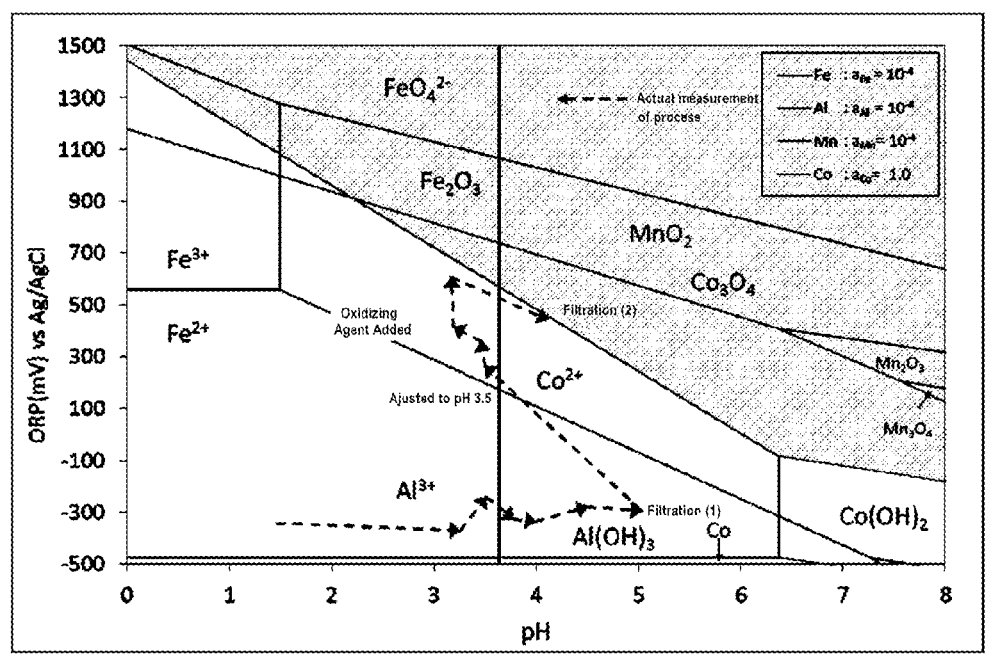

[FIG. 3]
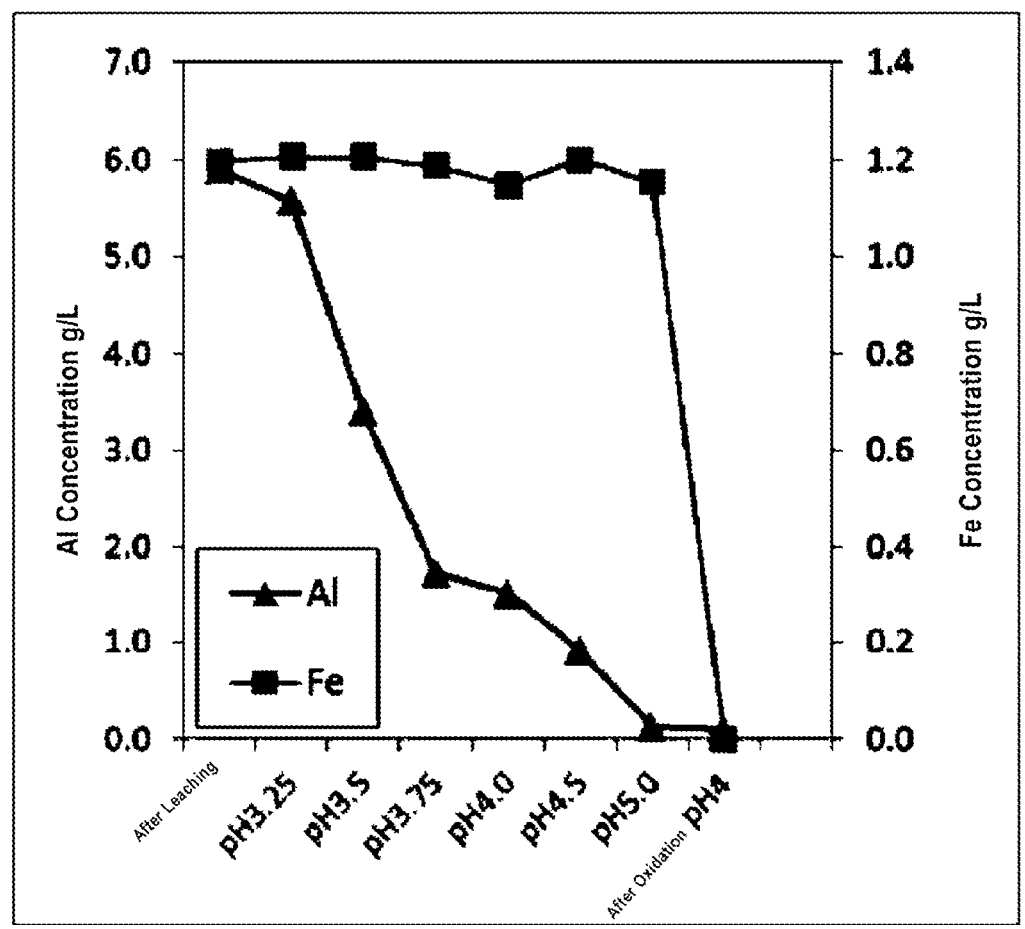

ent active materials contained in the positive electrode materials in the lithium ion battery scrap, and nickel oxyhydroxide.

PROCESSING METHOD FOR LITHIUM ION BATTERY SCRAP

TECHNICAL FIELD

The present invention relates to a method for processing lithium ion battery scrap. More particularly, the present invention proposes a technique that can be effectively used for recovering valuable metals from various lithium ion battery scrap.

BACKGROUND ART

Lithium ion batteries used in various industrial fields including various electronic devices employ lithium metal salts containing manganese, nickel and cobalt as positive electrode active materials. Recently, with an increased amount of lithium ion batteries to be used and expansion of the range of use, an amount of the lithium ion batteries to be discarded has been increased due to product life of the batteries and defects in the manufacturing processes.

Under such circumstances, there is a need for easily recovering expensive elements such as nickel and cobalt as stated above from a large amount of lithium ion battery scrap discarded, with a relatively low cost in order to reuse the elements.

In order to process the lithium ion battery scrap for recovering the valuable metals, the lithium ion battery scrap in the form of powder or particle obtained through each step such as roasting, crushing and sieving as required are firstly acid-leached using hydrogen peroxide water and lithium, nickel, cobalt, manganese, iron, copper, aluminum or the like that can be contained therein are dissolved in the solution to obtain a leached solution.

The leached solution is then subjected to a solvent extraction method to sequentially separate respective metal elements. In this case, the leached solution is sequentially subjected to a plurality of stages of solvent extraction or neutralization depending on the metals to be separated and each solution obtained in each stage is subjected to stripping, electrolysis, carbonization or other treatments, in order to separate each metal leached in the leached solution. More particularly, each valuable metal can be recovered by firstly recovering iron and aluminum, subsequently recovering manganese and copper, then cobalt, and then nickel, and finally leaving lithium in the aqueous phase.

For such prior arts, Patent Document 1 discloses a method for recovering nickel from an aqueous sulfuric acid solution containing nickel and cobalt, and impurity elements such as iron, aluminum and manganese, the method comprising: removing iron and aluminum from the aqueous sulfuric acid solution by an oxidation neutralization treatment, then separating and recovering a mixed hydroxide containing nickel and cobalt by a neutralization treatment, and then obtaining reverse extraction solutions each containing cobalt and nickel by a solvent extraction treatment from a concentrate obtained by dissolving the mixed hydroxide.

Further, Patent Document 2 discloses that an aqueous metal mixed solution containing a metal group A comprising of lithium, manganese, nickel and cobalt; and a metal group B consisting of copper, aluminum and iron are sequentially subjected to solvent extraction processes under certain conditions to recover each metal.

CITATION LIST

Patent Literatures

Patent Document 1: Japanese Patent Application Publication No. 2010-180439 A
Patent Document 2: Japanese Patent No. 5706457 B

SUMMARY OF INVENTION

Technical Problem

For example, when processing lithium ion battery scrap or the like in discarded consumer appliances, a leached solution obtained by leaching the lithium ion battery scrap may contain relatively large amounts of the positive electrode active materials contained in the positive electrode materials, iron and copper contained in negative electrode materials, as well as aluminum contained in aluminum foils deposited to the positive electrode materials or contained in housings or the like of the lithium ion batteries.

If lager amounts of iron and aluminum are contained in the leached solution, an increased number of stages of solvent extraction or an operation for diluting a pre-extraction solution or the like will be required in order to reliably remove the larger amounts of iron and aluminum, so that processing capacity will be decreased. Therefore, it is not desirable to use the conventional treatment method as it is for scrap of lithium ion batteries for consumer appliances or the like, which will result in a leached solution containing larger amounts of iron and aluminum.

An object of the present invention is to solve such problems suffering from the prior arts, and to provide a method for processing lithium ion battery scrap, which can effectively remove iron and aluminum from a leached solution obtained by leaching the lithium ion battery scrap, even if the leached solution contains relatively large amounts of iron and aluminum.

Solution to Problem

The present inventors have found that after leaching the lithium ion battery scrap and before recovering valuable metals contained in the lithium ion battery scrap from the leached solution, each of aluminum and iron in the leached solution is neutralized and oxidized under predetermined conditions, whereby the aluminum and iron can be effectively removed while suppressing recovery loss of valuable metals.

Based on such findings, the present invention provides a method for processing lithium ion battery scrap, the method comprising: a leaching step of leaching lithium ion battery scrap to obtain a leached solution; an aluminum removal step of neutralizing the leached solution to a pH range of from 4.0 to 6.0, then performing solid-liquid separation and removing aluminum in the leached solution to obtain a first separated solution; and an iron removal step of adding an oxidizing agent to the first separated solution and adjusting the pH in a range of from 3.0 to 5.0, then performing solid-liquid separation and removing iron in the first separated solution to obtain a second separated solution.

It is preferable that in the method for processing the lithium ion battery scrap according to the present invention, when the lithium ion battery scrap contains copper, the copper contained in the lithium ion battery scrap is left as a solid in the leaching step, and the copper in the leached solution is removed together with aluminum by the solid-liquid separation in the aluminum removal step.

It is preferable that in the method for processing the lithium ion battery scrap according to the present invention, the oxidizing agent added to the first separated solution in the iron removal step comprises one or more selected from the group consisting of manganese dioxide, positive electrode active materials, and manganese-containing leached residues obtained by leaching the positive electrode active materials.

It is preferable that when the second separated solution contains dissolved manganese, copper, iron and/or aluminum, the method for processing the lithium ion battery scrap further comprises an extraction step of subjecting the second separated solution to solvent extraction to remove manganese, copper, iron and/or aluminum.

In particular, it is preferable that the extraction step comprises subjecting the second separated solution to solvent extraction using a mixed extracting agent containing a phosphate ester-based extracting agent and an oxime-based extracting agent.

It is more preferable that the method for processing the lithium ion battery scrap according to the present invention further comprises a cobalt/nickel recovery step of recovering cobalt and/or nickel from an extraction residual solution after the extraction step.

It is more preferable that the method further comprises a lithium recovery step of recovering lithium after the cobalt/nickel recovery step.

Advantageous Effects of Invention

According to the method for processing the lithium ion battery scrap of the present invention, even if relatively large amounts of aluminum and iron are contained in the leached solution obtained by leaching the lithium ion battery scrap, iron and aluminum in the leached solution can be effectively removed prior to recovery of valuable metals from the leached solution.

BRIEF DESCRIPTION OF DRAWINGS

FIG. 1 is a flowchart showing a method for processing lithium ion battery scrap according to one embodiment of the present invention.

FIG. 2 is a potential-pH diagram of Co, Fe, Al, Mn, showing transition of pH and ORP values in an aluminum removal step and an iron removal step of Examples.

FIG. 3 is a graph showing changes in aluminum concentration and iron concentration in a solution with pH increase in an aluminum removal step and an iron removal step of Example.

DESCRIPTION OF THE PREFERRED EMBODIMENTS

Embodiments of the present invention will be described in detail below.

As illustrated in FIG. 1, a method for processing lithium ion battery scrap according to the present invention includes: a leaching step of leaching lithium ion battery scrap to obtain a leached solution; an aluminum removal step of neutralizing the leached solution to a pH range of from 4.0 to 6.0, then performing solid-liquid separation and removing aluminum in the leached solution to obtain a first separated solution; and an iron removal step of adding an oxidizing agent to the first separated solution and adjusting the pH in a range of from 3.0 to 5.0, then performing solid-liquid separation and removing iron in the first separated solution to obtain a second separated solution.

(Lithium Ion Battery)

The lithium ion battery for use in the present invention may be any lithium ion battery that can be used in various electronic devices such as mobile phones. Among them, so-called lithium ion battery scrap discarded due to lapses of lifetimes of battery products, manufacturing defects or other reasons is preferably used in terms of effective utilization of resources.

The lithium ion battery scrap that can be used may include so-called battery refuse, a mixture of the battery refuse and positive electrode materials with aluminum foils or positive electrode active materials, and materials obtained by roasting, chemically treating, crashing and/or sieving the battery refuse as required, and so on.

The battery refuse may include, in addition to the positive electrode active materials which are lithium metal salts containing manganese, nickel and cobalt, negative electrode materials containing carbon, iron and copper, and aluminum foils deposited to the positive electrode active materials, and aluminum housings of the lithium ion batteries. More particularly, the lithium ion battery may contain a single metal oxide composed of one element of lithium, nickel, cobalt and manganese forming the positive electrode active material, and/or a composite metal oxide composed of two or more elements, as well as aluminum, copper, iron, carbon and the like.

In the present invention it is particularly effective to use lithium ion battery scrap containing from 0.5% by mass to 5% by mass of iron; and from 0.5% by mass to 10% by mass of aluminum, because the lithium ion battery scrap containing relatively large amounts of iron and aluminum cannot be effectively processed by the conventional method.

(Leaching Step)

In the leaching step, for example, the above lithium ion battery scrap obtained through crashing/sieving is added to a leaching solution such as a sulfuric acid solution to leach the scrap. This step provides a leached solution in which certain metals contained in the lithium ion battery scrap has been leached.

Here, copper that may be contained in the lithium ion battery scrap is preferably left as a solid while maintaining a low leaching rate, until the end of leaching. This can be achieved by allowing an aluminum solid to be present in the leached solution, such as by being originally contained in the lithium ion battery scrap and/or by being separately added to the leached solution. While not wishing to be bound by any theory, the reason would be that aluminum is a less-noble metal than copper, i.e., aluminum has a lower standard oxidation reduction potential than copper, so that a dissolution reaction of aluminum proceeds earlier than that of copper contained in the lithium ion battery scrap, and copper which has been already dissolved in the acidic solution is precipitated.

This can lead to effective removal of copper left as a solid together with metals precipitated in the aluminum removal step when carrying out solid-liquid separation in the aluminum removal step that will be described below.

Although the aluminum solid as described above may be present in the acidic solution throughout the period from the initiation to the end of the leaching step, the aluminum solid may present in the acidic solution at least in a certain period of time during the leaching step. While the aluminum solid is present, the dissolution of copper will be suppressed.

In this case, only the lithium ion battery scrap containing aluminum powder may be added to the acidic solution as the aluminum powder originally contained in the lithium ion battery scrap for the aluminum solid to be present in the acidic solution. However, in addition to the lithium ion battery scrap, an aluminum solid may also be separately added to the acidic solution.

When the aluminum solid different from the lithium ion battery scrap is added to the acidic solution, the aluminum solid may be preferably aluminum powder obtained by processing other lithium ion battery scrap. This is because when recovering valuable metals such as nickel and cobalt from discarded lithium ion battery scrap and the like, the positive electrode active material containing the valuable metals may be peeled off from the aluminum foil to which the positive electrode active material for the positive electrode material adheres, and a large amount of aluminum powder may generated during the peeling processing, so that it is desirable to effectively utilize such aluminum powder.

Then, once the aluminum solid is completely dissolved, the dissolution of copper then begins. Therefore, it is advantageous that the leaching step is terminated before the aluminum solid in the acidic solution completely dissolves and copper contained in the lithium ion battery scrap starts to dissolve, in terms of being able to more effectively suppress the dissolution of copper. For example, the leaching step can be terminated before the leaching rate of cobalt or nickel sufficiently increases and the leaching rate of copper increases.

In the leaching step, the pH of the leaching solution may be from 0 to 2.0. If the pH is too high, then sufficient leaching velocities of cobalt and nickel may not be achieved. On the other hand, if the pH is too low, the leaching will rapidly proceed, copper will be leached out, and costs may be increased due to pH adjustment if there is a need for increasing the pH in the subsequent step.

In the leaching step, the leaching time from the time when the lithium ion battery scrap is added to the acidic solution to the end of the leaching may be from 0.5 hours to 10 hours. If the reaction time is too short, cobalt or nickel desired to be dissolved may not be sufficiently dissolved. On the other hand, if the leaching time is too long, the dissolution of the aluminum solid may be terminated and the dissolution of copper may begin. A more preferable range of the leaching time may be from 1 hour to 5 hours, and more preferably from 1 hour to 3 hours.

(Aluminum Removal Step)

In the aluminum removal step, aluminum in the leached solution obtained in the above leaching step is precipitated by increasing the pH of the leached solution to a pH range of from 4.0 to 6.0 to neutralize the leached solution, and removing the aluminum by subsequent solid-liquid separation to obtain a first separated solution.

In the aluminum removal step, if the pH is too low, aluminum cannot be sufficiently precipitated, whereas if the pH is too high, other metals such as cobalt will also be precipitated. From this viewpoint, the pH of the leached solution in the aluminum removal step is more preferably from 4.0 to 6.0, and even more preferably from 4.5 to 5.0.

In the aluminum removal step, an alkali such as sodium hydroxide, sodium carbonate and ammonia can be added to the leached solution in order to increase the pH to the above range.

In the aluminum removal step, the leached solution may preferably have an ORP value (ORP vs Ag/AgCl) of from −500 mV to 100 mV, and more preferably from −400 mV to 0 mV. If the ORP value at this time is too high, cobalt may be precipitated as tricobalt tetraoxide ($Co_3O_4$). On the other hand, if the ORP value is too low, cobalt may be reduced to an elementary metal (Co metal) which will be precipitated.

Further, in the aluminum removal step, the leached solution may preferably have a temperature of from 50° C. to 90° C. If the temperature of the leached solution is less than 50° C., reactivity may be deteriorated, and if it is higher than 90° C., a device that can withstand the elevated temperature will be required, as well as it is not preferable in terms of safety.

After sufficiently precipitating aluminum as described above, solid-liquid separation is carried out using a known apparatus and method such as a filter press and thickener to mainly remove the precipitated aluminum, thereby obtaining a first separated solution. The solid-liquid separation in the aluminum removal step can separate copper left as a solid without being dissolved in the leaching step, and also carbon that may be contained in the lithium ion battery scrap. Therefore, in the solid-liquid separation, copper can be removed together with aluminum, so that, for example, solid-liquid separation for removing copper alone immediately after the leaching step can be omitted, and improvement of processing efficiency and reduction of cost can be achieved.

Further, when filtering a precipitate of only aluminum, the aluminum precipitate in the form of gel is difficult to be filtered, resulting in a decrease in a filtration rate. However, in the solid-liquid separation in the aluminum removal step, the precipitate contains not only aluminum but also copper, carbon and the like, so that the copper, carbon and the like can compensate for the difficulty of filtration of the aluminum precipitate in the form of gel, and a time required for filtration can be shortened.

When the leached solution obtained in the leaching step as described above contains lithium dissolved therein and a molar ratio of lithium to aluminum in the leached solution (Li/Al ratio) is 1.1 or more, the aluminum contained in the precipitate in the aluminum removal step will produce composite oxides or composite hydroxides, such as gelatinous $Al(OH)_3$ as well as crystalline $LiAlO_2$ and $LiAl_2(OH)_7$, and will bring about a form close to a powder form. In this case, it is possible to further shorten the filtration time. From this viewpoint, the molar ratio (Li/Al ratio) of lithium to aluminum in the first separated solution is preferably 1.1 or more.

Lithium in the leached solution may be one in which lithium originally contained in the lithium ion battery scrap has been acid-leached, as well as one in which other lithium-containing materials have been added to the leached solution and acid-leached. Further, the Al/Li ratio in the leached solution can also be adjusted by adding the lithium-containing materials. For the lithium-containing materials, reagents may be used. However, the lithium-containing materials that can be preferably used include lithium compounds such as lithium carbonate and lithium hydroxide obtained in the processing of lithium ion battery scrap, and aqueous lithium solutions obtained by dissolving at least one of these compounds in water.

(Iron Removal Step)

In the iron removal step, an oxidizing agent is added to the first separated solution obtained in the aluminum removal step, and a pH of the first separated solution is adjusted to a pH range of from 3.0 to 5.0 to precipitate iron in the first separated solution, and the iron is then removed by subsequent solid-liquid separation to obtain a second separated solution.

In the iron removal step, iron in the first separated solution is oxidized from divalent iron to trivalent iron by adding the oxidizing agent to the first separated solution, and the trivalent iron is precipitated as an oxide (hydroxide) at a lower pH than the divalent iron. Therefore, iron can be precipitated by adjusting the first separated solution to the relatively low pH as described above. In many cases, iron is precipitated as a solid such as iron hydroxide ($Fe(OH)_3$).

Here, if the pH is greatly increased, precipitation of cobalt will occur, but in the iron removal step, iron can be precipitated without increasing the pH so much, so that precipitation of cobalt at this time can be effectively suppressed.

In the iron removal step, if the pH is too low, iron cannot be sufficiently precipitated, whereas if the pH is too high, other metals such as cobalt will also be precipitated. From this viewpoint, the pH of the first separated solution in the iron removal step is more preferably from 3.0 to 4.0, and even more preferably from 3.0 to 3.5.

Further, in the iron removal step, the first separated solution has an oxidation-reduction potential (ORP vs Ag/AgCl), i.e., an ORP value, of from 300 mV to 900 mV, and more preferably from 500 mV to 700 mV. If the ORP value at this time is too low, iron may not be oxidized. On the other hand, if the ORP value is too high, cobalt may be oxidized and precipitated as an oxide.

In the iron removal step, an acid such as, for example, sulfuric acid, hydrochloric acid and nitric acid, can be added to the first separated solution in order to decrease the pH to the above range prior to the addition of the oxidizing agent.

The oxidizing agent added to the first separated solution in the iron removal step is not particularly limited as long as it can oxidize iron. Preferable oxidizing agent includes manganese dioxide, positive electrode active materials and/ or manganese-containing leached residues obtained by leaching the positive electrode active materials. These materials can effectively oxidize iron in the first separated solution. It should be noted that manganese dioxide may be contained in the manganese-containing leached residues obtained by leaching the positive electrode active materials with an acid or the like.

When using the above positive electrode active material or the like as the oxidizing agent, a precipitation reaction occurs in which manganese dissolved in the first separated solution is converted to manganese dioxide. Therefore, the precipitated manganese can be removed together with iron.

After adding the oxidizing agent, an alkali such as sodium hydroxide, sodium carbonate and ammonia can be added to adjust the pH within the predetermined range.

(Extraction Step)

For the reason that manganese is contained in the lithium ion battery scrap, and the like, the manganese may be contained in the second separated solution obtained in the iron removal step, or copper, aluminum and iron left without being completely removed in the leaching step, the aluminum removal step and the iron removal step may be contained in the second separated solution. In this case, the second separated solution may be subjected to an extraction step of extracting manganese or the like. However, when manganese or the like is not contained in the second separated solution, the extraction step may be omitted.

Specifically, in the extraction step, the second separated solution can be subjected to solvent extraction using a mixed extracting agent containing a phosphate ester-based extracting agent and an oxime-based extracting agent to separate manganese, copper, iron and/or aluminum.

In particular, the use of the phosphate ester-based extracting agent in combination with the oxime-based extracting agent can significantly improve a separation efficiency of copper, iron and/or aluminum. Among them, most of copper can be extracted.

(Cobalt/Nickel Recovery Step)

After the manganese extraction step, cobalt and/or nickel in the extraction residual solution are recovered. The recovery processes of cobalt and/or nickel can be carried out by known methods, respectively. More particularly, cobalt and nickel can be sequentially subjected to solvent extraction processes, respectively, and cobalt in the solvent can be transferred back to the aqueous phase by stripping and recovered by electrowinning, and nickel in the solvent can also be recovered by stripping and electrowinning.

(Lithium Recovery Step)

When lithium remains after the cobalt/nickel recovery step, lithium in the aqueous phase can be, for example, carbonated and recovered as lithium carbonate.

EXAMPLES

The present invention was experimentally conducted and its effects were confirmed as described below. However, the description herein is merely for the purpose of illustration and is not intended to be limited thereto.

Lithium ion battery scrap in the form of powder, having the composition as shown in Table 1, was leached with one-fold molar equivalent of sulfuric acid based on the metal components contained, to obtain a leached solution. The leached solution was sequentially subjected to an aluminum removal step and an iron removal step under conditions described below, and decreases in concentrations of aluminum and iron and a loss rate of cobalt were confirmed.

TABLE 1

| | Components | | | |
|---|---|---|---|---|
| | Co | Fe | Al | Li |
| %-dry | 30 | 1.2 | 6.1 | 4.1 |

In the aluminum removal step, sodium hydroxide was added to the leached solution to neutralize it, the pH was increased to 5.0, and solid-liquid separation (filtration 1) was then carried out. The temperature of the solution at this time was 70° C.

In the subsequent iron removal step, sulfuric acid was added, and manganese dioxide was then added as an oxidizing agent such that a pulp concentration was 8.7 g/L. Sodium hydroxide was then added to adjust the pH to 4.0, and solid-liquid separation (filtration 2) was carried out. An oxidation time herein was 2 hours.

The plotting of the pH and ORP values (ORP vs Ag/AgCl) in the aluminum removal step and the iron removal step on a potential-pH diagram of Co, Fe, Al and Mn provides the transition as indicated by arrows in FIG. 2. FIG. 2 showed that precipitation of cobalt was prevented, because the transition of pH and ORP values in the aluminum removal step and the iron removal step was not in the region where cobalt was precipitated to be converted into tricobalt tetraoxide ($Co_3O_4$) (the region drawn by oblique lines in FIG. 2).

Further, FIG. 3 shows a graph illustrating changes in the aluminum concentration and the iron concentration in the solution with a change in the pH in the aluminum removal step and the iron removal step, and Table 2 shows a filtration rate and a loss rate of cobalt in each of the filtrations 1 and 2.

TABLE 2

| Filtration Rate (L/min · m$^2$) | | Loss Rate (%) of Co | | |
|---|---|---|---|---|
| Filtration 1 (pH 5.0) | Filtration 2 (pH 4.0) | Filtration 1 (pH 5.0) | Filtration 2 (pH 4.0) | Total |
| 5.3 | 8.8 | 3.3 | 0.2 | 3.5 |

As can be seen from FIG. 3, iron and aluminum were sufficiently removed in each of the aluminum removal step and the iron removal step. As the final concentration in the solution, the aluminum concentration was 112 mg/L and the iron concentration was <1 mg/L.

Further, as can be seen from Table 2, the final loss rate of cobalt could be suppressed to a lower level.

The solution obtained after the aluminum removal step and the iron removal step as stated above was subjected to solvent extraction using a mixed extracting agent containing a phosphate ester-based extracting agent and an oxime-based extracting agent. As a result, in the solution after the solvent extraction, the aluminum concentration was <1 mg/L, and the iron concentration was <1 mg/L, demonstrating that aluminum and iron could be completely removed.

COMPARATIVE EXAMPLE

The leached solution as described above was subjected to solvent extraction using the mixed extracting agent containing the phosphate ester-based extracting agent and the oxime-based extracting agent without carrying out the aluminum removal step and the iron removal step. As the concentration in the solution after the solvent extraction, the aluminum concentration was 2980 mg/L and the iron concentration was 290 mg/L. Aluminum and iron could not be completely removed.

What is claimed is:

1. A method for processing lithium ion battery scrap, the method comprising:
   a leaching step of leaching lithium ion battery scrap to obtain a leached solution;
   an aluminum removal step of neutralizing the leached solution to a pH range of from 4.0 to 6.0, then performing solid-liquid separation and removing aluminum in the leached solution to obtain a first separated solution; and
   an iron removal step of adding an oxidizing agent to the first separated solution and adjusting the pH in a range of from 3.0 to 5.0, then performing solid-liquid separation and removing iron in the first separated solution to obtain a second separated solution.

2. The method for processing the lithium ion battery scrap according to claim 1, wherein the lithium ion battery scrap contains copper; and
   wherein the copper contained in the lithium ion battery scrap is left as a solid in the leaching step, and the copper in the leached solution is removed together with aluminum by the solid-liquid separation in the aluminum removal step.

3. The method for processing the lithium ion battery scrap according to claim 1, wherein the oxidizing agent added to the first separated solution in the iron removal step comprises one or more selected from the group consisting of manganese dioxide, positive electrode active materials, and manganese-containing leached residues obtained by leaching the positive electrode active materials.

4. The method for processing the lithium ion battery scrap according to claim 1,
   wherein the second separated solution contains manganese, copper, iron and/or aluminum dissolved in the second separated solution; and
   wherein the method further comprises an extraction step of subjecting the second separated solution to solvent extraction to remove manganese, copper, iron and/or aluminum.

5. The method for processing the lithium ion battery scrap according to claim 4, wherein the extraction step comprises subjecting the second separated solution to solvent extraction using a mixed extracting agent containing a phosphate ester-based extracting agent and an oxime-based extracting agent.

6. The method for processing the lithium ion battery scrap according to claim 4, further comprising a cobalt/nickel recovery step of recovering cobalt and/or nickel from an extraction residual solution after the extraction step.

7. The method for processing the lithium ion battery scrap according to claim 6, further comprising a lithium recovery step of recovering lithium after the cobalt/nickel recovery step.

* * * * *